United States Patent [19]
Townsend

[11] Patent Number: 5,203,816
[45] Date of Patent: Apr. 20, 1993

[54] ELECTRIC FLEA TRAP

[76] Inventor: Daniel M. Townsend, P.O. Box 230943, San Diego, Calif. 92023-0943

[21] Appl. No.: 845,225

[22] Filed: Mar. 2, 1992

[51] Int. Cl.$^5$ ............................................... A01M 1/14
[52] U.S. Cl. .......................................... 43/114; 43/113
[58] Field of Search .............. 43/114, 113, 112, 132.1, 43/121, 122, 115, 116, 117

[56] References Cited

U.S. PATENT DOCUMENTS

| | | | |
|---|---|---|---|
| 1,946,509 | 2/1934 | Trammell | 43/113 |
| 3,023,539 | 3/1962 | Emerson, Jr. | 43/113 |
| 3,986,292 | 10/1976 | Klebanoff | 43/112 |
| 4,366,643 | 1/1983 | Boaz | 43/113 |
| 4,654,998 | 4/1987 | Clay | 43/113 |
| 4,686,789 | 8/1987 | Wiliams | 43/113 |

FOREIGN PATENT DOCUMENTS

WO8706795 11/1987 PCT Int'l Appl. .

*Primary Examiner*—Richard K. Seidel
*Assistant Examiner*—Chuck Y. Mah

[57] ABSTRACT

Apparatus and method for an electric flea trap employing an emitted light as an attractant and a sticky substance as a trap, wherein the sticky substance is between the insect and the emitted light.

11 Claims, 1 Drawing Sheet

ELECTRIC FLEA TRAP

BACKGROUND OF THE INVENTION

1. Technical Field

This invention relates to insect traps, particularly to traps employing a light attractant of a blue wavelength and a trap employing a sticky substance, wherein the insects are immobilized and perish.

2. Description of the Background Art

In U.S. Pat. No. 4,157,629, ultraviolet radiation is used for attracting flying insects. It is common knowledge that ultraviolet radiation can be dangerous. It is common scientific knowledge that ultraviolet radiation damages the eyes and skin, and is carcinogenic. To use this type of attractant for fleas, would be extremely dangerous because little children and pets propel around on a carpet.

In U.S. Pat. No. 4,700,506, issued to Williams, the attractant is a green light, and the trap is a sticky substance lying within a shallow pan covering a considerable area of the carpet. The trap also has a reflecting cover. These factors limit the effectiveness of the trap. That is, the fleas under the trap are not attracted because of the pan over the carpet, and the flying insects above the trap are not attracted because of the cover. This limits exposure of the attractant to insects.

Furthermore, the sticky substance is disposed within the flat pan below the light. The substance is accessible to children and pets, unless it is protected by a grid. The fleas jump up at the reflected light and have to land in the sticky substance in order to be exterminated. Fleas that land, either by chance or wilfully, onto the grid are not trapped in the sticky substance. Thus, there are many fleas escaping the trap.

What would be particularly useful is an insect trap that is safe, non-toxic, non-obnoxious, attractive, inexpensive and highly effective.

SUMMARY OF THE INVENTION

An effective, inexpensive, unobjectionable, attractive, safe, and easy to set up, clean and maintain insect trap, is an objective of this invention.

In accordance with the present invention, one object is a trap for catching insects comprising a blue, elongated, translucent, open-ended tubular member having a sticky coating on the outer surface thereof. A protective screen sleeve of a mesh sufficient to permit ingress of insects is disposed concentrically about the tubular member.

Two end-pieces, each end-piece having a matching infacing surface, removably engage the tubular member and the protective screen sleeve. At least one of the end-pieces has a light socket means connectible to a source of electricity. A light source means is engaged by the light socket and is centrally, axially disposed within the tubular member between the two end-pieces.

Also contemplated is an insect trapping system wherein the sticky coating is on a separate, removable, semi-rigid, transparent substrate circumscribing the tubular member and disposed between the light source and the protective screen sleeve, the sticky coating facing out toward the protective screen sleeve. The substrate may be a cylindrical sleeve, a triangular sleeve, or planar sheets disposed so as to stand between the protective screen and the light source.

In a more preferred embodiment, the trap for catching insects comprises a base, containing four legs, and a protective screened housing comprised of a removable screen wall to permit insect ingress disposed between two end-pieces, at least one endpiece containing a light socket. Centrally disposed within the housing between the two end-pieces is a light means, for example, a fluorescent light means. A removable, semi-rigid, blue, transparent substrate, having a sticky substance coating on a surface facing outward toward the protective screen housing, is disposed between the light source and the protective screen housing.

In keeping with one of the preferred objects of this invention, and in accordance with my teachings, the housing may comprise a wall of any geometric shape, that is, the housing containing the light therein can be cylindrical, triangular or rectangular in shape, or be of almost any non-planar, threedimensional configuration. Thus, for example, the housing can be of a spherical configuration.

A method for trapping insects, an attractant comprising a blue, translucent central tubular member containing a light means within, and a trap comprising a sticky coating over the member is also an object of this invention. The trap has to be positioned between the attractant and the insect. As the insect propels itself toward the attractant, and lands thereon, it adheres to the attractant by the sticky coating.

Certain advantages attach to this invention, namely:

a) It is advantageous to have the sticky substance disposed between the insect and the attracting light because this results in a direct trajectory and landing. This is more efficient than an indirect path taken in at least one existing trap, wherein the insect, attracted by an overhead light, propels toward the light and falls into a sticky substance below.

b) This invention can be used for various types of insects besides fleas. For example, one can hang the trap outside in a picnic or patio area to catch flying insects. Positioned on a carpet floor at night, the apparatus is effective in attracting and trapping flies, mosquitos and certain other insects, provided they are attracted by the blue wavelength of light.

c) Unlike other traps, e.g., those using a pan with a sticky coating positioned on the floor and a reflecting cover, and covering a large area of carpet containing fleas, the trap of this invention is capable of attracting and trapping insects through a window of 360°. It can, therefore, attract and kill fleas from the entire carpet and flies or other flying insects simultaneously.

d) The trap of this invention is quiet and attractive. It does not kill insects by "zapping" them when they touch an electric grid. Many humans finds this offensive. The blue light, coupled with a pleasing geometric design is attractive, much like a decorator lamp.

Still further embodiments and advantages of the invention will become apparent to those skilled in the art upon reading the entire disclosure contained herein.

DETAILED DESCRIPTION OF THE PREFERRED EMBODIMENT

Figure 1:
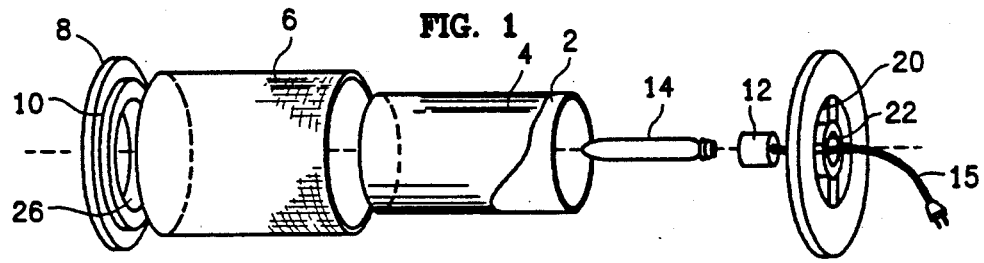
FIG. 1 is an exploded view of the basic components of this invention.

Illustrated generally in FIG. 1, is a trap 1 for catching insects comprising a blue, elongated, translucent, open-ended tubular member 2 having a sticky coating 4 on the outer surface thereof. A protective screen sleeve 6 of a mesh sufficient to permit ingress of insects is disposed concentrically about the tubular member 2.

Two end-pieces 8, each end-piece having a matching infacing surface 10, removably engage the tubular member 2 and the screen sleeve 6. At least one of the end-pieces has a light socket 12 connectible to a source of electricity by means of a lead wire 15. The electricity used may be typical household current, or a rechargeable battery system may be employed. A light source means 14, preferably fluorescent, is engaged by the light socket 12 and is centrally, axially disposed within the tubular member 2 between the two end-pieces 8. It is to be noted that the space surrounding the light means within the tubular member is vented by openings in both endpieces.

Figure 2:
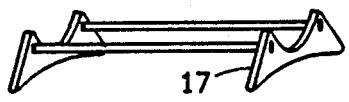
FIG. 2 is a perspective view of an optional base for the apparatus of this invention.

The trap can be supported by an optional base as illustrated in FIG. 2, in order to prevent rolling if, for example, pushed by playful pets. The base may also present a more attractive appearance. Alternatively, stability can be realized by molding the end-pieces so as to include legs 18, as shown in FIG. 3.

Figure 3:
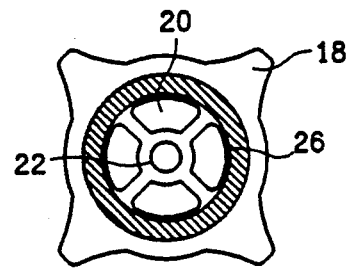
FIG. 3 is a view of one of the end-pieces of this invention.

FIG. 3 depicts the infacing surface of the end-piece that contains a light socket. Upon inspection of FIGS. 1 and 3, it will be seen that the light socket fits into the aperture 22. The tubular member slip-fits into the annular cavity 26. The protective screen sleeve slip-fits over the annular surface 10. It will be appreciated that there are other means known to those familiar with the art to secure the tubular member and screen sleeve to the end-pieces.

The tubular member may be constructed of glass or plastic. To get optimal effectiveness, it is critically important that blue light is emitted to attract insects, therefore, the tubular member may be made from blue glass or plastic, or contain a blue coating. Alternately, as is shown in FIGS. 4, 5, a blue plastic substrate 16, which is coated with a sticky substance can be used.

Figure 4:
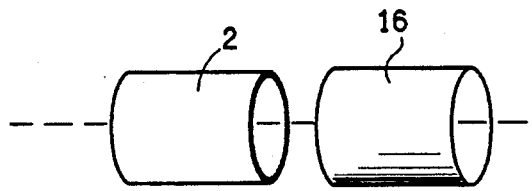
FIG. 4 shows a tubular member and a closefitting plastic substrate coated with sticky substance on the outside surface.

FIG. 4 illustrates the sticky coating 4 on a removable, semi-rigid, transparent substrate sleeve 16 circumscribing the tubular member 2 and disposed between the light source and the protective screen sleeve. The substrate may be clear or blue, depending on whether the tubular member is blue. The sticky coating faces out toward the protective screen sleeve. The plastic substrate may be a cylindrical sleeve as shown in FIG. 4, or planar sheets adhesively disposed so as to stand between the protective screen and the light source, as shown in FIG. 5.

Figure 5:
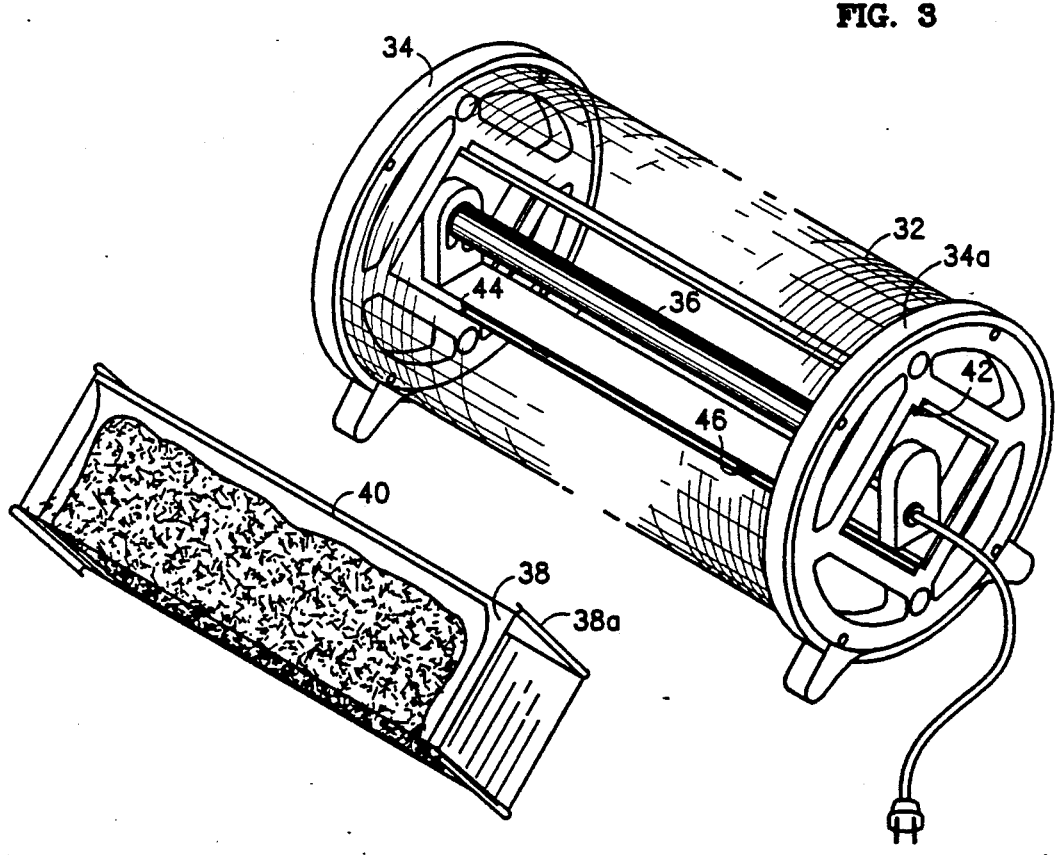
FIG. 5 is a drawing of one embodiment of this invention, showing the screen housing, end-pieces, fluorescent light and its platform and channels for sliding the plastic panels with sticky substance shown below the housing.

FIG. 5 depicts one embodiment of the a trap for catching insects that comprises a protective screened housing having a removable screen wall 32 disposed between two end-pieces 34, 34a. Centrally disposed within the housing between the two end-pieces is a fluorescent light source means 36. Two removable, L-shaped, transparent plastic panels 38, 38a, with thin, blue plastic sheeting 40 having a sticky substance coated on a surface facing outward toward the protective screen housing, are disposed between the light source means and the screen wall 32. The plastic panels slide in dorsally and ventrally provided channels 42. The fluorescent light source is a lamp that sits on (or hangs from) a flat platform 44 held in position by slotted tabs 46 engaging the platform.

In keeping with the preferred objects of this invention, and in accordance with my teachings, the protective screen wall, interior walls and end-pieces may be of any geometrical shape, so long as the spatial relationship described herein is maintained. That is, it can be cylindrical, triangular or rectangular in shape, or be of almost any non-planar, three-dimensional configuration. Thus, for example, the housing can be of a spherical configuration.

The instant invention teaches an improved method for trapping insects, employing a) an attractant comprising a blue light emitting, translucent central tubular member containing a light means within, and b) a trap comprising a sticky substance disposed between the light source and the insect. The trap has to be positioned between the attractant and the insect. As the insect propels itself toward the attractant, it lands on, or crashes into the sticky substance trap where it adheres and perishes.

When a certain portion of the trap gets saturated with insect cadavers, it can be turned to expose an insect-free area. When the entire sticky surface is saturated, the substance and insects are scraped or washed off. The trap surface is regenerated by applying new sticky substance. Where the sticky substance is on a disposable plastic sleeve, it is conveniently replaced without mess.

Although the present invention has now been described in terms of certain preferred embodiments, and exemplified with respect thereto, one skilled in the art will readily appreciate that various modifications, changes, omissions and substitutions may be made without departing from the spirit thereof. It is intended, therefore, that the present invention be limited solely by the scope of the following claims.

What is claimed is:

1. A trap for catching insects, comprising:
    (a) an elongated, translucent, open-ended tubular member having a sticky coating on the outer surface thereof;
    (b) a protective screen sleeve made of mesh for permitting ingress of some insects but to exclude appendages of children and pets, disposed concentrically about said tubular member;
    (c) two end-pieces, each end-piece having an infacing surface removably engaging said tubular member and said screen sleeve, one of said end-pieces having an electrical connection means connectible to a source of electricity; and
    (d) a light source means connected to said source of electricity by said electrical connection means and held by at least one end-piece, said light source axially disposed within said tubular member between said two end-pieces.

2. A trap in accordance with claim 1, wherein said sticky coating is on a separate, removable, semi-rigid, transparent substrate circumscribing said tubular member and disposed between said light source and said protective screen sleeve, said sticky coating facing out toward said screen sleeve.

3. A trap in accordance with claim 1, wherein said substrate is a cylindrical sleeve disposed so as to stand between the protective screen and the light source.

4. A trap in accordance with claim 1, wherein said substrate is a triangular sleeve disposed so as to stand between the protective screen and the light source.

5. A trap in accordance with claim 1, wherein said substrate is planar sheets disposed so as to stand between the protective screen and the light source.

6. A trap for catching insects, comprising:
  (a) a cylindrical screen housing comprised of;
    i) an cylindrical, open-ended, removable protective screen wall;
    ii) a fluorescent light source centrally disposed within said housing and connected to an external electric power source;
    iii) two removable, rigid, transparent, L-shaped plastic panels disposed between said light source and said screen wall;
    iv) two removable, semi-rigid blue transparent plastic substrate sheets having adhesive backing and a sticky substance coating on a surface facing outward toward said protective screen wall, said substrate disposed between said light source and said protective screen wall; and
    v) two end-pieces, each end-piece containing an infacing surface to engage said screen wall, plastic panels and said fluorescent light source; and
  (b) a base having four legs.

7. A trap in accordance with claim 6, wherein said housing comprises a wall of any geometric shape.

8. A trap in accordance with claim 6, wherein said fluorescent light source is disposed upon a flat platform running between said end-pieces.

9. A trap in accordance with claim 6, wherein said L-shaped plastic panels disposed between said light source and said screen wall are slidable in and out of said housing in channels running between said end-pieces.

10. A method for trapping insects, comprising:
  (a) providing a centrally located attractant comprising a radiating light; and
  (b) providing a translucent trap comprising a sticky substance circumscribing said radiating light and positioned directly in line between said light and said insects,
wherein said attractant light radiates 360° from its source and is visible to said insects irrespective of the spatial viewing position of said insects.

11. A trap for catching insects, comprising:
  (a) an elongate light source means for radiating light in a circle;
  (b) a translucent tubular member surrounding the elongate light source and having a sticky coating on the outer surface thereof;
  (c) a protective cylindrical screen sleeve, surrounding the tubular member, for permitting ingress of insects attracted by the light source means to the tubular member for capture on the sticky coating thereof.

* * * * *